US010335954B2

(12) United States Patent
Monceaux et al.

(10) Patent No.: US 10,335,954 B2
(45) Date of Patent: Jul. 2, 2019

(54) METHODS AND SYSTEMS FOR MANAGING DIALOGS OF A ROBOT

(71) Applicant: SOFTBANK ROBOTICS EUROPE, Paris (FR)

(72) Inventors: Jérôme Monceaux, Paris (FR); Gwennaël Gate, Paris (FR); Gabriele Barbieri, Paris (FR); Taylor Veltrop, Paris (FR)

(73) Assignee: SOFTBANK ROBOTICS EUROPE, Paris (FR)

( * ) Notice: Subject to any disclaimer, the term of this patent is extended or adjusted under 35 U.S.C. 154(b) by 87 days.

(21) Appl. No.: 15/301,931

(22) PCT Filed: Apr. 17, 2015

(86) PCT No.: PCT/EP2015/058361
§ 371 (c)(1),
(2) Date: Oct. 4, 2016

(87) PCT Pub. No.: WO2015/158881
PCT Pub. Date: Oct. 22, 2015

(65) Prior Publication Data
US 2017/0113353 A1 Apr. 27, 2017

(30) Foreign Application Priority Data

Apr. 17, 2014 (EP) .................................. 14305581

(51) Int. Cl.
*G10L 15/22* (2006.01)
*B25J 13/00* (2006.01)
(Continued)

(52) U.S. Cl.
CPC ......... *B25J 13/003* (2013.01); *B25J 11/0005* (2013.01); *G10L 13/027* (2013.01);
(Continued)

(58) Field of Classification Search
None
See application file for complete search history.

(56) References Cited

U.S. PATENT DOCUMENTS 7,003,462 B2 * 2/2006 Shambaugh .......... G10L 13/033
379/265.06
8,594,845 B1 * 11/2013 Gharpure ................ G10L 15/22
700/253

(Continued)

FOREIGN PATENT DOCUMENTS

EP 1 343 144 A1 9/2003
EP 1 669 172 A1 6/2006

*Primary Examiner* — Abul K Azad
(74) *Attorney, Agent, or Firm* — Baker Hostetler LLP

(57) ABSTRACT

A computer-implemented method of handling an audio dialog between a robot and a human user comprises: during the audio dialog, receiving audio data and converting audio data into text data; in response to text data, determining a dialog topic, the dialog topic comprising a dialog content and a dialog voice skin; wherein a dialog content comprises a plurality of sentences; determining a sentence to be rendered in audio by the robot; receiving a modification request of the determined dialog sentence. Described developments for example comprise different regulation schemes (e.g. open-loop or closed-loop), the use of moderation rules (centralized or distributed) and the use of priority levels and/or parameters depending on the environment perceived by the robot.

14 Claims, 2 Drawing Sheets

(51) Int. Cl.
  *B25J 11/00*  (2006.01)
  *G10L 13/027* (2013.01)
  *G10L 15/26*  (2006.01)
  *G10L 15/18*    (2013.01)

(52) U.S. Cl.
  CPC .............. *G10L 15/22* (2013.01); *G10L 15/26* (2013.01); *G10L 15/1822* (2013.01)

(56) References Cited

U.S. PATENT DOCUMENTS

| | | | |
|---|---|---|---|
| 8,812,171 B2* | 8/2014 | Filev | B60W 50/10 701/1 |
| 2006/0155765 A1* | 7/2006 | Takeuchi | G06F 17/30654 |
| 2013/0158707 A1 | 6/2013 | Lee et al. | |

* cited by examiner

METHODS AND SYSTEMS FOR MANAGING DIALOGS OF A ROBOT

TECHNICAL FIELD

This patent relates to the field of digital data processing and more particularly to the handling of voice synthesis and interactive dialogs, in particular in the specific context of a conversation between a robot and a human user.

BACKGROUND

Companion robots advantageously can establish an emotional relationship with human beings. Dynamic adaptations of dialogs can enable rich interactions.

Existing systems for speech or voice synthesis are mostly passive and uniform: beyond a few options like man or female voice choices, the tone of the speech generation engine is rather neutral. What is more, provided responses lack cultural references. The objective of industrial or mass market voice answering systems precisely is to provide universally accepted responses, i.e. to be as widely understood as possible. This implies to avoid any contextual and a fortiori cultural references. Voice commands are generally limited to specific contexts. For example, voice dictation software is mostly used in the context of a standalone software application (for example Word processing software). According to some accessibility features increasingly provided with modern operating systems, users can use voice commands to perform certain actions (for example launching an application, copy and paste, etc). These predefined actions are rather limited. Such visual or audio interaction modes are generally passive (e.g. users are actively giving orders and the machine executes the orders). Even with recent computer interaction models, such as those implemented in answering systems for example, limited interactions occur from the machine to the user.

In the context of a companion humanoid robot, the interaction model with human users significantly changes when compared with the interaction model with personal computers (and their different forms). The cognitive interaction with a robot is fundamentally different than the one with a tablet PC or a smartphone. In particular, the ability to modulate speech synthesis (form) and/or to adapt the contents of the dialog (substance) of the robot can be beneficial if not key to a rich interaction, which in turn can allow to gather relevant data and to improve the services rendered by the robot or connected devices.

There is a need for methods and systems of managing dialogs or conversations between a robot and a human user.

SUMMARY

There is disclosed a computer-implemented method of handling an audio dialog between a robot and a human user, the method comprising: during said audio dialog, receiving audio data and converting said audio data into text data; in response to said text data, determining a dialog topic, said dialog topic comprising a dialog content and a dialog voice skin; wherein a dialog content comprises a plurality of sentences; determining a sentence to be rendered in audio by the robot; receiving a modification request of said determined dialog sentence.

The sentence planned to be expressed by the robot (for example a response by the robot to a question of the user) is "buffered", i.e. not rendered in audio immediately. This leaves place for multiple regulation schemes, for example: who can transmits a modification request, what criteria are applied to accept or reject a modification request, when the audio rendering occurs, etc. Additional considerations as to why such requests are communicated can be described.

In a development, the method further comprises rejecting said modification request and restituting in audio the determined dialog sentence.

In this embodiment, the response provided by the robot can be the response "by default", i.e. as defined by the manufacturer of the robot (for example). This embodiment corresponds to the open-loop scheme: i.e. not in real-time. By contrast, other approaches are described hereinafter.

In a development, the method further comprises accepting said modification request and restituting in audio the modified determined dialog sentence.

This embodiment can correspond to the "closed-loop" scheme: i.e. dialogs can be changed on-the-fly by different entities. This also allows introducing further regulation or moderation mechanisms. The latency being introduced is generally manageable.

In a development, accepting or rejecting a modification request comprises comparing the planned sentence with one or more moderation rules. In a development, the one or more moderation rules are predefined. In this embodiment, the acting moderation logic can be the one of the manufacturer of the robot.

In a development, the one or more moderation rules are retrieved from a network. Moderation also can be "crowd-sourced" (for example, bad reactions of users to certain sentences can be consolidated on the installed base and moderation rules can be maintained in the cloud and applied by individual robots).

In a development, the one or more moderation rules comprise one or more filters, said filters comprising blacklists of one or more words or whitelists of one or more words.

In a development, the modification request is emanating from a single party. In this embodiment, the dialog is authored by one party, for example corresponding to a "corporate" authoring (e.g. a software editor or the manufacturer of the robot).

In a development, the modification request is a vote of a plurality of parties. In this embodiment, it is underlined that there is one source of modification but that this source can crystallize the results from multiple entities. In particular, the entities can be software modules or layers, i.e. internal to the robot (or in the cloud). These entities also can correspond to human voters (for example who can collaboratively edit dialogs).

In a development, the modification request is associated with a priority level. In this embodiment, a priority level is introduced and allows handling possible conflicts in the moderation or regulation.

In a development, the modification request is dependent on the environment perceived by the robot. In a development, the modification request is dependent on parameters selected from the list comprising age of a user, gender of a user, mood of a user, emotion of a user, number of users, interaction history with a user, user preferences, spatial placement of the robot and/or of a user, gesture or combination of gestures of the robot and/or a user, detected event in the environment of the robot, local weather, geolocation, date, time and combinations thereof.

In a development, the method further comprises receiving the feedback of a user after restituting in audio the modified determined dialog sentence.

There is disclosed a computer program comprising instructions for carrying out one or more steps of the method when said computer program is executed on a suitable computer device or robotic device. There is disclosed a system comprising means adapted to carry out one or more steps of the method.

A companion robot is generally multimodal. Voice interactions constitute a critical part of the interaction with users, along movements which characterize a robot by contrast with a personal computer and its declinations. Dialogs between a user and a robot can enhance or personalize the interactions and in fine improve the user experience. In an embodiment, the robot adapts itself to the current perceived context through adaptations of its dialog modes. The robot for example can say "Mister" to a foreigner or can use the surname of a person if allowed to do so in the past, speak more or less formal depending on users and/or context. Specific words also can be filtered depending on users, history, feedbacks, moods, location, date and time (for example). When a person does not understand a sentence, the robot can repeat slowly and/or with synonyms, if asked to do so or at its own initiative. The robot also can learn the preferences of the user (speak more or less quickly with which vocabulary), improving the mood of the user.

Advantageously, a robot can implement new languages extensions, rendering each robot unique, initiate positive emotions and therefore strengthen the relationship of the robot with human beings.

Advantageously, according to some embodiments, the man-machine interaction is active and no longer passive: the robot, from a human perspective, can take some initiatives (e.g. the robot can ask questions, for example for disambiguation purposes). Furthermore, with adapted dialog contents or patterns expressed in a personalized or otherwise relevant manner, the man-machine interaction is further optimized.

Advantageously, a conversational mode of interaction allows for a more "intimate" "relationship" with the user, at least more a more "natural" interaction. This better user experience is likely to lead to an increased "understanding" of the human user by the machine. The associated "proximity" with the machine, implied and reinforced by relevant voice skins and/or dialog sentences, can facilitate the collection of data from and about the user. Both the user and the robot can be more "expressive". The term "expressivity" refers to the fact that since the man-machine interaction is being (more) natural, the user communicates more data to the robot, which in turn can know and store more data about the user, enriching further interactions in a virtuous circle. This is not true for a personal computer. A tablet may try to ask "questions", for example in the form of a quiz or questionnaire or by speech synthesis, but as the tablet is not considered as a "companion" which can (autonomously) move itself, displace objects or follow humans, a residual bias will remain. The amount of data which can be captured will be smaller when compared with a companion robot. The fact that the companion robot can use funny or otherwise relevant voice skins or dialog patterns reinforces this ability to capture data.

Information actively or passively gathered about a user (e.g. user profiling or user declared preferences), can be used as an input for launching conditions (e.g. a voice skin or dialog pattern should only launch if the user loves "Bienvenue chez les Ch'tis"). Mechanisms of machine learning can be performed: voice skins or dialog patterns which are launched or executed by the system will evolve depending on what is learned about the user.

BRIEF DESCRIPTION OF DRAWINGS

Embodiments of the present invention will now be described by way of example with reference to the accompanying drawings in which like references denote similar elements, and in which.

DETAILED DESCRIPTION

Figure 1:
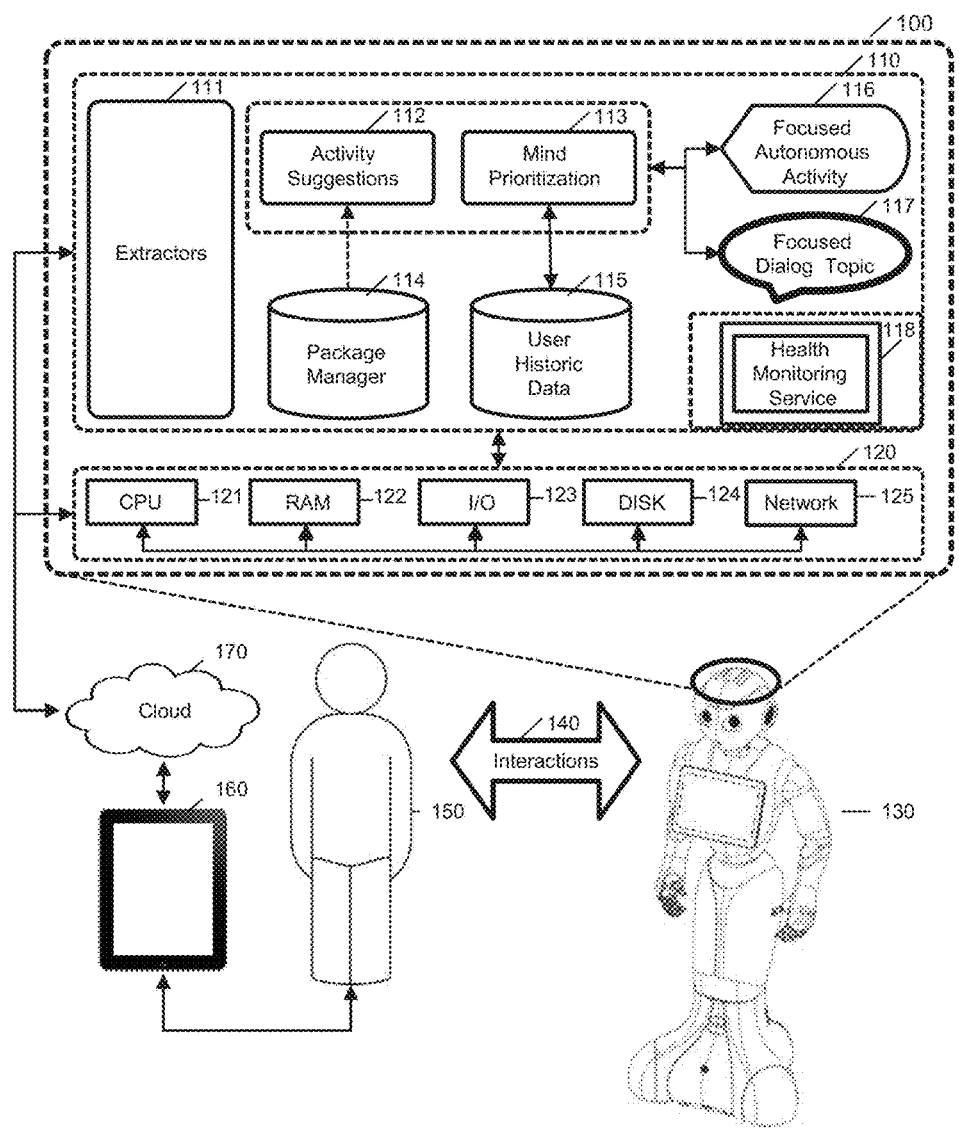
FIG. 1 illustrates the global technical environment of the invention.

The terms "dialog", "dialog engine", "dialog mode", "dialog topic", "dialog content", "dialog voice skin" are defined hereafter.

A "dialog" designates the global audio interaction with one or more users. A "dialog" comprises prefabricated sentences and rules to express and manage these prefabricated sentences. A "dialog" is regulated by a "dialog engine", which corresponds to the logic managing rules and sentences. In more details, a "dialog" can correspond to a plurality of "dialog modes" (which correspond to the results of the different combinations of sentences expressed with a particular audio rendering, e.g. sentence A expressed with tone 1 and pitch 1, sentence A expressed with tone 1 and pitch 2, sentence B expressed with velocity 3, etc) a). A "dialog" is composed of "dialog topics". A "dialog topic" is a dynamic repository which comprises both a) data and b) programs. The data comprises "dialog content" (i.e. the very substance, e.g. a collection of predefined sentences) and "dialog voice skin" (i.e. the form, e.g. voice speech parameters such as velocity, tone, frequency and pitch). The programs (e.g. scripts) comprise logical rules to manage dialog dynamic interactions (e.g. rules for managing transitions between topics, for managing priorities of topics, for fallback situations etc).

A "dialog topic" is a repository comprising both (static) data such as sentences and (dynamic) software programs (e.g. scripts or pseudo code such as logical rules to be further interpreted and executed). Data corresponds to predefined dialog sentences (for example a plurality of questions and possible or expected answers) and software programs or scripts or rules (for example rules for managing transitions between dialog topics or for managing fallback situations).

A dialog topic can, thus comprise 1) sentences and/or triggering rules to allow the user to enter in the topic 2) proposals of sentences to be said by the robot to talk about the topic and to raise questions 3) sentences and/or rules to manage user answers 4) sentences and/or rules to explicitly manage transitions between topics 5) sentences and/or rules to manage fallback situations.

Each dialog topic can be associated with metadata, comprising a) a semantic description which is primarily used to decide to launch or execute a software application or not b) contextual launching rules (age groups, numbers of persons, location, time of the day) c) conflicts management rules (when several applications do compete for execution (associated priority levels can solve such conflicts) d) fallback sentences in case of conflicts or of errors (for example, a fallback sentence can be "I feel tired now, why don't we do something else") d) others such as priorities expressed as indications (values) and/or rules (Boolean expressions). In particular, a dialog topic can be associated with a priority order. Specific portions of the dialog topic can be associated with sub priorities.

A dialog topic can comprise predefined multimodal interactions. A dialog topic installed in a robot comprises a computer program code which when executed can perform one or more method steps. A dialog topic (e.g. a collection of predefined sentences, including responses to anticipated questions) can be associated with an action (e.g. the execution of a dance, movements of the head or any physical action) and/or an animation (e.g. activation of lightning's if any, etc) and combinations thereof (e.g a dialog while dancing).

Dialog topics can be associated with software applications installed on the robot. Examples of associated dialog topics comprise dialogs associated with a weather application adapted to provide local weather conditions (e.g. discussing recommended clothes, past weather, jokes or allusions), dialogs associated with a game application (e.g. dialogs of encouragements, jokes, remarks), dialogs associated with a dance application.

A robot generally is multimodal (combinations of audio feedbacks, visual feedbacks, movements). A software application installed on a robot can lead to a set of physical actions of the robot (dancing, moving, seizing and displacing an object). A software application for a smart phone or a tablet generally does not comprise a real tangible action in the physical world.

Software applications can be interdependent. For example, because software applications can represent complex objects, there can be observed "transitions" between a priori distinct software applications (or dialog topics). On a tablet computer, a weather software application provides meteorological data, while a drawing software application provides drawing tools. On a robot, it is conceivable that the robot accompanies the spoken result "it is −10° C. degrees outside" and/or draws a snowman on a piece of paper (and/or by symbolizing the outside cold by a combination of gestures). In other words, as a result of a multimodal output, software applications or dialog topics may be further combined (at the output levels or at lower levels, e.g. variables or parameters or scripts can be shared or modified between software applications).

A "dialog mode" corresponds to combinations of substance ("dialog pattern" or "dialog content") and form ("voice skin" or "voice rendering") of a planned sentence. In other words, a "dialog mode" is associated with a substantive aspect (e.g. the factual content or information conveyed by the message) and with a formal aspect (e.g. expressivity or emotions or tones of the spoken language).

A "dialog content" or "dialog pattern" refers to a collection of predefined sentences, said sentences corresponding to questions and (anticipated or expected or possible) answers, for example around a certain theme or topic or area of interest (but not necessarily, as a general scope of sentences can be envisioned).

A "dialog skin" or a "dialog voice skin" refers to audio rendering modifications. Such audio rendering modifications affect the "form" (e.g. frequency, velocity, pitch and tone). In other words the application of a dialog skin can change radically the expressivity of the robots without modifying underlying pre-fabricated sentences. The impact of the modification of the speech interaction with the robots can be assessed at different levels: content-wise (substance) and/or form (tones, etc). A voice skin can comprise parameters leading to imitate certain voices. A diversity of voice parameters can be handled to manage speech synthesis. Voice parameters comprise frequency (determination if the robot will speak more sharply or deeply), velocity (how fast or slow the robot will speak), tone (for example if actor Sylvester Stallone and character Master Yoda speak at the same velocity and frequency, they do not have the same tone).

"Dialog rules" for example refer to execution rules that govern the application of one or more voice skins and/or dialog contents or patterns. An "execution rule" can comprise scripts, program code or otherwise Boolean expressions or logical rules which allow adapting phrases that the robot can say (vocabulary, addition of some expressions before or at the end of a sentence, etc). Each time a robot is supposed to say something to a human user (for example because the robot is trying to answer a question or to disambiguate a situation), if a planned sentence of the robot does match one or several dialog execution skins rules, the sentence will be modified according to these rules and subsequently the robot will say it. In an embodiment, one or more dialog execution rules can be applied to one or more sentences (i.e. planned to be said by the robot). In an embodiment, said rules can be applied to each sentence to be said by the robot. In an embodiment, the rules can be applied to a subset of sentences, for example those comprising predefined words or expressions). Dialog execution rules can be predefined. Dialog execution rules also can be dynamically retrieved from the Internet. Some rules can be additive while some others can be mutually exclusive. For example, an execution rule can comprise (e.g. encode) an age limit. Cumulative execution rules can be used or applied. For example a particular voice skin can be authorized in front of users aged above 12 and/or according certain situations (time of the day, measured emotions in audiences, etc). Some execution rules can be configurable by users (e.g. parental controls).

FIG. 1 illustrates the global and technical environment of the invention. A robot 130 comprises sensors and actuators. A logic or "mind" 100 is implemented in the robot or associated with it (for example remotely) and comprises a collection of software 110 and hardware components 120. The robot 130 is interacting (by bilateral or two-ways communications 140, including one or more dialog sessions) with one or more users 150. Said one or more users can access other computing devices 160 (for example a personal computer such as a wearable computer or a smartphone or a tablet), which can be connected devices (in communication with a cloud of servers 170 and/or a fleet of other robots or connected objects, etc). In particular, a connected device can be a wearable computer (e.g. watch, glasses, immersive helmet, etc).

The specific robot 130 on the figure is taken as an example only of a humanoid robot in which the invention can be implemented. The lower limb of the robot on the figure is not functional for walking, but can move in any direction on its base which rolls on the surface on which it lays. The invention can be easily implemented in a robot which is fit for walking.

In some embodiments of the invention, the robot can comprise various kinds of sensors. Some of them are used to control the position and movements of the robot. This is the case, for instance, of an inertial unit, located in the torso of the robot, comprising a 3-axis gyrometer and a 3-axis accelerometer. The robot can also include two 2D color RGB cameras on the forehead of the robot (top and bottom). A 3D sensor can also be included behind the eyes of the robot. The robot can also optionally comprise laser lines generators, for instance in the head and in the base, so as to be able to sense its relative position to objects/beings in its environment. The robot can also include microphones to be capable of sensing sounds in its environment. The robot of the invention can also include sonar sensors, possibly located at the front and the back of its base, to measure the distance to objects/human beings in its environment. The robot can also include tactile sensors, on its head and on its hands, to allow interaction with human beings. It can also include bumpers on its base to sense obstacles it encounters on its route. To translate its emotions and communicate with human beings in its environment, the robot of the invention can also include LEDs, for instance in its eyes, ears and on its shoulders and loudspeakers (for example located in its ears). The robot can communicate with a base station, with other connected devices or with other robots through various networks (3G, 4G/LTE, Wifi, BLE, mesh, etc). The robot comprises a battery or source of energy. The robot can access a charging station fit for the type of battery that it includes. Position/movements of the robots are controlled by its motors, using algorithms which activate the chains defined by each limb and effectors defined at the end of each limb, in view of the measurements of the sensors.

In a specific embodiment, the robot can embed a tablet with which it can communicate messages (audio, video, web pages) to its environment, or receive entries from users through the tactile interface of the tablet. In another embodiment, the robot does not embed or present a screen but it does have a video projector, with which data or information can be projected on surfaces in the vicinity of the robot. Said surfaces can be flat (e.g. floor) or not (e.g. deformations of the projecting surfaces can be compensated to obtain a substantially flat projection). In both embodiments (with screen and/or with a projector), embodiments of the invention remain valid: the claimed interaction model is only supplemented or complemented by visual interaction means. In any case, would the graphical means be out of order or deactivated on purpose, the conversational mode of interaction remains.

In an embodiment, the robot does not comprise such graphical user interface means. Existing humanoid robots are generally provided with advanced speech capabilities but are generally not provided with GUI. Increasing communities of users will probably not use graphical means (e.g. tablet, smartphone), even as a complement, to communicate with the robot, by choice and/or necessity (young people, impaired persons, because of a practical situation, etc).

The collection of software 110 (non-exhaustively) comprises software modules or objects or software code parts, in interaction with one another, including "extractors" 111, "activity suggestions" 112, "mind prioritization" 113, "package manager" 114, "User historical data" 115, "Focused Autonomous activity" 116 and "Focused Dialog Topic" 117 and a "Health Monitoring Service" 118.

An "Extractor Service" 111 generally senses or perceives something internal or external of the robot and provides short term data into the robot's memory. An Extractor service receives input readings from the robot sensors; these sensor readings are preprocessed so as to extract relevant data in relation to the position of the robot, identification of objects/human beings in its environment, distance of said objects/human beings, words pronounced by human beings or emotions thereof. Extractor services in particular comprise: face recognition, people perception, engagement zones, waving detection, smile detection, gaze detection, emotion detection, voice analysis, speech recognition, sound localization, movement detection, panoramic compass, robot pose, robot health diagnosis, battery, QR code handling, home automation, tribes, time and schedule.

An "Actuator Service" makes the robot 130 physically do or perform actions. Motion tracker, LEDs, Behavior manager are examples of "Actuator Services".

A "Data Service" provides long-term stored data. Examples of Data Services are a User Session Service 115, which stores user data, and their history of what they have done with the robot and a Package Manager Service 114, which provides a scalable storage of procedures executed by the robot, with their high level definition, launch conditions and tags. "Package Manager" in particular provides the scalable storage of Activities and Dialogs, and the Manifest. The "Manifest" contains metadata such as launch conditions, tags, and high level descriptions.

A "Mind Service" (for example a service Mind Prioritization 113) is one that will be controlled by the robot's central "Mind" when it is initiating action. "Mind Services" tie together "Actuator services" 130, "Extractor services" 111 and "Data services" 115. Basic Awareness is a "Mind Service". It subscribes to "Extractor Services" such as People perception, Movement detection, and Sound localization to tell the Motion Service to move. The "Mind" 113 configures Basic Awareness's behavior based on the situation. At other times, Basic Awareness is either acting own its own, or is being configured by a Running Activity.

"Autonomous Life" is a Mind Service. It executes behavior activities. Based on the context of a situation, the Mind can tell autonomous life what activity to focus ("Focused Autonomous Activity" 116). Metadata in manifests tie this information into the mind. Any activity can have access to one or more of the Operating System APIs. Activities can also directly tell Autonomous Life what activity to focus, or tell the Dialog Service what topic to focus on.

The "Dialog" service can be configured as a Mind Service. It subscribes to the speech recognition extractor and can use "Animated Speech Actuator Service" to speak. Based on the context of a situation, the Mind can tell the Dialog what topics to focus on (a "Dialog Topic"). The "Dialog" service also has its algorithms for managing a conversation and is usually acting on its own. One component of the Dialog service can be a "Focused Dialog Topic" service 117. Dialog Topics can programmatically tell the Mind to switch focus to (or execute or launch) a different Activity or Dialog Topic, at any time. One example of possible method to determine the Dialog Topic can comprise: at the moment that an dialog topic or activity's launch conditions become true or false, a list of all possible Activities or Dialog Topics for the moment is sent to the Mind; the list is filtered according to activity prioritization; the list order is randomized; the list is sorted (or scored) to give precedence to Activities or Dialog Topics that are "unique" and have been started less often; a special check to make sure the top Dialog Topic or Activity in this list isn't the same activity as the previous activity that was executed. The list can be again sorted and filtered according to the preferences of the user.

The robot can implement a "health monitoring" service 118. Such a service can act as a daemon or a "watchdog", to review or control or regulate the different priorities of the robot. Such a service can monitor (continuously, intermittently or periodically) the status of the internal components of the robot and measure or anticipate or predict or correct hardware failures. In a development, the fleet (e.g. installed base) of robots is monitored. The embedded service can continuously detect faulty situations and synchronize them with a "cloud" service (once every minute for example).

Hardware components 120 comprise processing means 121, memory means 122, Input/Output I/O means 123, mass storage means 124 and network access means 125, said means interacting with one another (caching, swapping, distributed computing, load balancing, etc). The processing means 121 can be a CPU (multicore or manycore) or a FPGA. The memory means 122 comprise one or more of a flash memory or a random access memory. The I/O means 123 can comprise one or more of a screen (e.g. touch screen), a light or LED, a haptic feedback, a virtual keyboard, a mouse, a trackball, a joystick or a projector (including a laser projector). The storage means 124 can comprise one or more of a hard drive or a SSD. The network access means can provide access to one or more networks such as a 3G, 4G/LTE, Wifi, BLE or a mesh network. Network traffic can be encrypted (e.g. tunnel, SSL, etc).

In an embodiment, computing resources (calculations, memory, I/O means, storage and connectivity) can be remotely accessed, for example as a complement to local resources (available in the robot itself). For example, further CPU units can be accessed through the Cloud for voice recognition computing tasks. Computing resources also can be shared. In particular, a plurality of robots can share resources. Connected devices in the vicinity of the robot also can share resources to some extent, for example via secured protocols. Display means also can be shared. For example, the television can be used as a further display by the robot when passing by.

Figure 2:
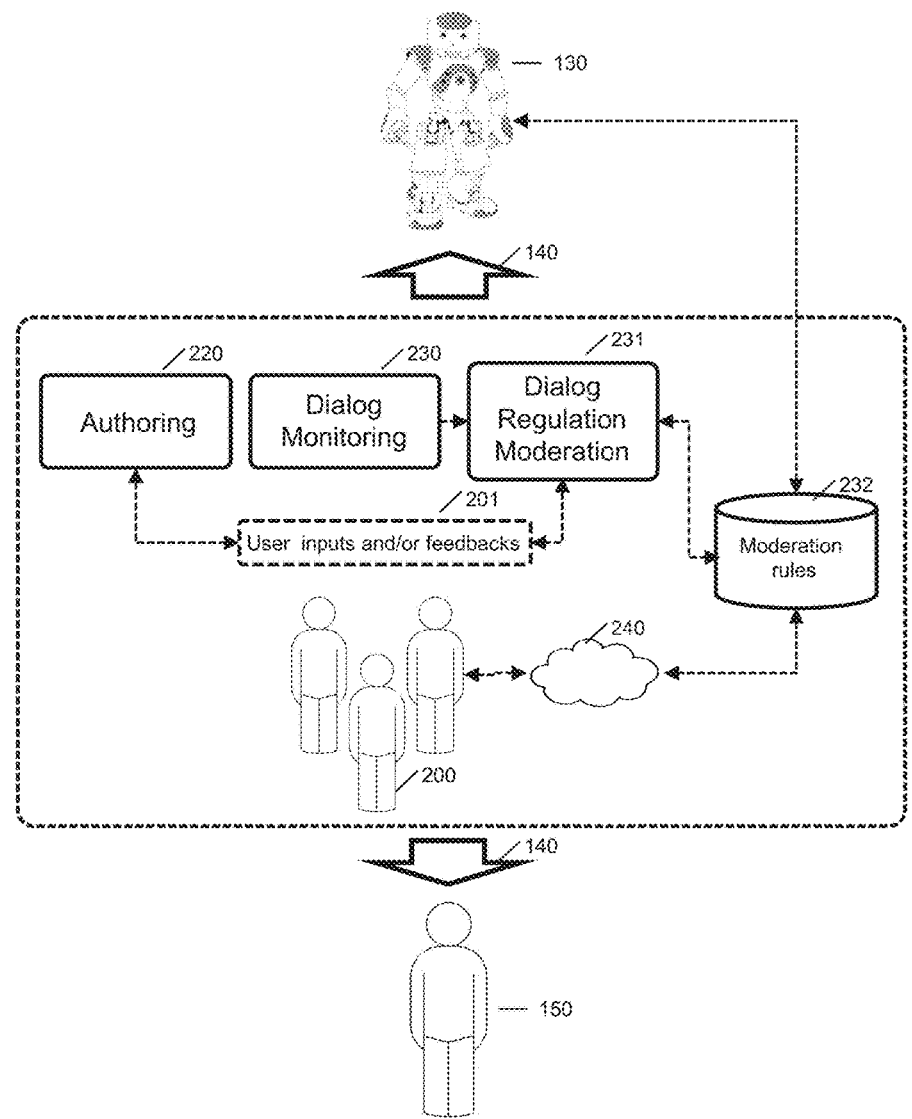
FIG. 2 details some aspects of an embodiment of the method.

The FIG. 2 illustrates the management of dialogs. Dialogs can be authored 220 from one or more entities. Dialogs topics can be monitored 230 and usage statistics can be used in different manners: later in time after human analysis or in near-real time (e.g. by updating the installed base of robots). Different regulation schemes 231, in particular moderation, are described hereinafter.

Embodiments of the collaborative authoring of dialogs 220 are now described.

Different authoring 220 models are possible. In an embodiment, dialogs are authored by the manufacturer of the robot. This allows a certain form of control of the public behavior of the robot, for example by default.

In an embodiment, dialogs can be authored by software editors or software providers or ISVs (independent software vendors). According to this model, the legal liability of the corresponding companies is engaged. Software editors can have to respect rules defined by the manufacturer of the robot or the robotic platform operator (absence of bad words, respectful behavior, etc). Examples of dialog topics comprise a dialog topic "robots", a dialog topic "cooking" or a dialog topic "sports". Each dialog topic can be sent to the cloud, for example on one or more servers, and/or reside on each robot. Topics optionally can be factorized (e.g. optimized, and/or concatenated and/or assimilated) into one unique language model. In an embodiment, dialog topics are factorized on the robot. In an embodiment, a robot can install a plurality of dialog topics. Therefore each robot can have its proper language model. In an embodiment, dialog topics are factorized in the cloud, as mirrors of the different robots of the installed base. In an embodiment, dialog topics are partly factorized in the cloud and partly in the robot.

In an embodiment, dialogs in full or in parts can be edited by the crowd (i.e. crowd-sourced authoring). In such an embodiment, the number of persons contributing to the dialog contents and/or rules can be significantly higher when compared to "corporate" authoring of dialogs. The technical difficulty of editing a dialog can be lowered to the point where a maximal number of persons can contribute to the editing of dialog contents. Crowd sourcing models and techniques have proven that the coverage (in terms of the number of topics available, and also in terms of quality of contents) can be superior compared to closed (e.g. proprietary) models. The control of the compliance of the constructed dialogs can be handled or managed at downstream software layers (module for censoring or inhibiting certain words or expressions in the course of a dialog. Open systems are advantageously used to collaboratively enrich the databases of dialog contents. Open systems advantageously leverage the creativity of communities of users, and in the end produce a better and larger knowledge base. In practice, a robot can have access to a wide variety of topics, ranging from cooking receipts to knowledge on flowers. This aspect is reinforced by the fact that the robot can retrieve and install "on demand" dialog topics (e.g. with a connected robot). Such a broad coverage is more difficult to get with "closed" developments. The burden of control is shifted to the regulation mechanisms implemented in the robot.

In an embodiment, dialog contents constantly evolve ("wiki dialogs").

In an embodiment, dialog contents are aggregated from disparate sources. For example, dialogs can result from the aggregation of dialogs "by default", additional dialog modules of software providers and automated extractions of the web. In an embodiment, a format is defined to handle dialogs databases. The format is of a specific syntax and defines a specific data structure. Having a defined format of dialog enables assimilation of disparate sources and facilitates the management of conflicts, possibly originating from the collection disparate sources (e.g. which source to trust first)

Embodiments of the monitoring of dialog topics 230 are now described.

Dialogs can be monitored 230. Since a diversity of software applications or dialog topics can be installed on each robot of the installed base (or subpart of it, like a fleet), quantitative measurements can be performed as to the different activities of said dialog topics. Such metrics for example can comprise the measurement of how many times a given dialog topic has being launched, how long, in what geographies, what were the reactions of users (e.g. emotions, smiles, mood, answers). Each dialog topic can be associated with a given specific metrics. A plurality of metrics can be consolidated and/or aggregated and be further analyzed.

Monitoring of dialog topics can be valuable for a) the robotic platform operator, for general purposes b) for the dialog topic provider (in order to improve contents, for example the contents of the jokes in case of "jokes" application, correct bugs or incorrect or non optimized rules, improve return on investments, time spent etc) and c) for the user himself (better user experience and interaction, etc.).

The knowledge of consolidated statistics can lead the robotic platform operator to fine tune the probability of launch of the different dialog topics. The robotic platform operator can maintain a ranking of the different dialog topics. Said ranking can be dynamic and/or contextual. For example if a dialog topic reveals to be successful, said dialog topic can be preferably launched in further cases. Generally speaking, the manufacturer or the robot or the robotic platform operator can aggregate individual interactions and further construct a global (i.e. aggregated, consolidated) social interaction model (with a user, with a plurality of users, with a representative user, etc). Advantages for the dialog topic provider comprise the possibility of continuous improvements of the considered application, by accessing a local (narrower) perspective about the usage of the dialog topic. The time being spent with the dialog topic can be globally analyzed. But in more details, the contextual conditions of the launch of the dialog topic can be investigated in-depth. Such an analysis father enables the app provider to improve the launching and/or transition conditions. In an embodiment, a licensing model can be in pay-per-download, but also can be in pay-per-usage (or revenue-per-usage).

In an embodiment, the activities being monitored can comprise parameters or values or criteria such as time and frequency (e.g. frequency of execution per day or per week or per month, frequency of user request, when the dialog topic is launched most, for example in the morning or in the evening, on Sundays, etc), time spent (e.g. total interaction time), geolocation (for example to analyze where a dialog topic has the more success), errors (e.g. dialog topic bugs or crashes, incorrect rules, inaudible sentences, bad reactions of users, etc), transitions between dialog topics (e.g. "Markov" models indicating transitions between dialog topic; for example the weather application can be strongly coupled with the news app while loosely coupled with the cooking app, and dialog bridges can be established), dialog topic performance statistics (e.g. aside errors, at what speed was data retrieved and the dialog topic is executed, etc), satisfaction of users (e.g. perceived emotions or moods passively or implicitly captured, declarations of satisfaction when actively and explicitly solicited), triggering conditions (e.g. statistics allowing to understand why and when a dialog topic is launched), interacting users (e.g. profiles of users, gender, age, etc)

Embodiments of the management of dialogs 231 are now described.

The management of dialogs 231 (dialog topics and/or dialog contents and/or dialog skins and/or dialog rules) can be implemented in software packages. For example, such packages can be authored 220 through user inputs and/or feedbacks 201 or defined or programmed by the manufacturer of the robot or by software editors. Such software can be modifiable or not. For example, a dialog topic (e.g. a voice skin) may be fully determined (e.g. no further parameterization can be officially allowed). Alternatively, a dialog topic can be only partially determined. For example, some (e.g. in finite number) local parameters may remain under the control of end users while a majority of settings cannot be changed (to maintain the overall integrity of the voice skin for example).

Software applications can manage dialog topics (data and/or programs). In particular, software applications can manage dialog content (e.g. a collection of predefined sentences, including responses to anticipated questions) and/or dialog skin and/or programs and rules (e.g. programming on top of dialog contents, i.e. execution rules such as adaptations as functions of the environment, synchronization with movements of the head, activation of lightning's if any, etc) and combinations thereof (e.g a dialog while dancing).

Software applications can be interdependent. As a result of a multimodal output, software applications may be further combined (at the output levels or at lower levels, e.g. variables or parameters or scripts can be shared or modified between software applications). For example, a robot can accompany a spoken result "it is −10° C. degrees outside" by a combination of gestures symbolizing the outside cold.

Software applications advantageously can be presented to the user through a dialog interface, i.e. during the course of action of a ("natural") dialog with the user. In other words, the dialog system can act like a "bottleneck" for the user to be able to launch or execute one or more applications.

A "dialog engine" operates the final decision level, to activate or deactivate in real time, and in context, the different dialog topics. In other words, the "dialog engine" module supervises (or controls or regulates or synchronizes or operates) the one or more transitions between dialogs topics. In an embodiment, only installed topics can be activated. In an embodiment a dialog topic can be installed on the fly. In particular, the dialogue engine arbitrates between declared priorities and sub priorities of the respective dialog topics "in competition" for activation. Depending on the context, a global topic is defined as well as different other subtopics. The hierarchical model evolves over time and dialog topics candidates are continuously defined. The management of conflicts can be solved by the use of heuristics. A first heuristics is "that longest rule wins". In case of conflicts emanating from two topics resulting into the same sentence, the longest rule always win for example "let's talk about humanoid robots" is selected against "let's talk about robots". It can be assumed that longer strings of character convey more information than shorter strings of characters. A second heuristics is associated with the freshness of information. If rules are strictly identical then the most recent topic can win. For example if the user went through the topics "cooking" then "robots" then "humanoid robots" then "dog", the latter topic "humanoid robots" will be chosen instead of the topic "robots". If no topic as being discussed with the user and if the user has defined a description, then the robot can ask to the user about a topic of his choice. If no description is predefined, then a topic can be chosen randomly.

The management of dialogs with or in or by a robot can be implemented in the form of downloadable software programs, said programs comprising instructions which when executed on a suitable robotic device cause said robotic device to perform particular physical actions, comprising performing programmed dialog modes (dialog contents and/or voice skins). A software program can be provided as an "extension module" or a "plug-in" or an "add-on". Additional dialog modes can be combined or added or substituted to the default dialog content and voice skin of the robot. In an embodiment, dialog modes can be called as services for other software applications installed on the robot. For example, a weather application can use Dark Vador's voice in a certain context (e.g. full moon). Dialog modes and/or associated execution rules can be accessed through a network or be accessed locally. In some embodiments, they are complemented or supplemented by accesses to networks and remote knowledge bases.

Embodiments of the "regulation" (or "moderation") of dialogs are now described.

Regarding the regulation of dialogs, several architectures are possible (e.g. open loop embodiments, semi open-loop embodiments, closed-loop embodiments).

In an open-loop embodiment, user feedbacks are controlled by a human moderation (e.g. an administration panel centralizes feedbacks about dialogs, for example responses to particular questions, and one or more human beings, on a case-by-case basis, decide whether the dialog model has to be changed or not. In an embodiment, an open-loop regulation mechanism is implemented. After data is gathered and that further statistics are derived from said data, human analyzes of statistics can be performed and further corrections (e.g. software updates) or actions (e.g. reengineering of services) can be taken. Advantageously, said corrections and/or actions can be of quality (even if changes are not immediately or rapidly brought to the robot).

In a closed-loop embodiment, feedback loops can more directly lead to local improvements (e.g. a locally considered robot will speak better and better). In other words, "best practices" can be propagated across the installed base of robots. "Bad practices" are likely to be filtered out before they can be propagated. In an embodiment, a closed-loop regulation mechanism is implemented. Apps metrics and/or statistics are directly coupled with the software applications. Advantageously, bugs reports and a fortiori zero day exploits do trigger automatic and "immediate" updates or patches. Changes can be propagated at any level of impact of the user experience by the software applications. For example, if statistics indicate that the weather app is massively coupled with the news app, software updates can manage the fleet of robots to systematically propose the news after the weather is announced. The latency of such updates can be reduced with intention. In some cases, local rules (e.g. user profiles or preferences) can maintain prior systems despite the global update. As the fiability of applications increases (trustful data and or dynamic and systemic behaviors), closed loop systems can be implemented.

In an embodiment, moderation is also crowd-sourced. That is while the edition of dialogs can be opened (to some extent), the moderation also can be opened. Given enough eyeballs all bugs are shallow: a bad word pronounced in front of a sufficient number of persons is susceptible to be filtered out "socially".

Regarding the moderation of the dialogs, one or more moderation rules 232 can be used (i.e. the planned sentence to be said by the robot can be compared with one or more moderation rules 232). In an embodiment, the rules 232 are predefined (the acting moderation logic can be the one of the manufacturer of the robot). In an embodiment, the one or more moderation rules 232 are retrieved from a network (moderation also can be "crowd-sourced" 200. For example, bad reactions of users to certain sentences can be consolidated on the installed base and moderation rules 232 can be maintained in the cloud 240 and applied by individual robots 130. The one or more moderation rules 232 can comprise one or more filters, said filters comprising blacklists of one or more words or whitelists of one or more words. Certain words to be censored (e.g. the use of determined words can be forbidden, be it binary or according probabilities or thresholds). To the contrary, some other words can be allowed or the use of some words can be encouraged (bias).

The disclosed methods can take form of an entirely hardware embodiment (e.g. FPGA), an entirely software embodiment or an embodiment containing both hardware and software elements. Software embodiments include but are not limited to firmware, resident software, microcode, etc. The invention can take the form of a computer program product accessible from a computer-usable or computer-readable medium providing program code for use by or in connection with a computer or any instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

The invention claimed is:

1. A computer-implemented method of handling an audio dialog between a robot and a human user, the method comprising:
   during said audio dialog, receiving audio data and converting said audio data into text data;
   in response to said text data, determining a dialog topic, said dialog topic comprising a dialog content and a dialog voice skin, wherein the dialog content comprises a plurality of sentences, and the dialog voice skin includes audio rendering modifications and voice skin parameters including frequency, velocity and tone;
   determining a sentence to be rendered in audio by the robot;
   receiving a modification request of said determined dialog sentence, wherein the modification request is a vote of a plurality of parties;
   applying one or more moderation rules to the modified determined dialog sentence according to said modification request, wherein the one or more moderation rules comprise one or more filters, said one or more filters comprising blacklists of one or more words or whitelists of one or more words; and
   producing a dialog expression based on the modified determined dialog sentence and the one or more moderation rules.

2. The method of claim 1, further comprising accepting said modification request and restituting in audio the modified determined dialog sentence.

3. The method of claim 2, further comprising receiving the feedback of a user after restituting in audio the modified determined dialog sentence.

4. The method of claim 1, wherein the one or more moderation rules are predefined.

5. The method of claim 1, wherein the one or more moderation rules are retrieved from a network.

6. The method of claim 1, wherein the one or more moderation rules are derived from the aggregation of user feedbacks to dialog sentences expressed by one or more robots.

7. The method of claim 6, said one or more moderation rules being obtained after centralized human supervision and being distributed among one or more robots by an update mechanism.

8. The method of claim 6, said one or more moderation rules being modified locally in a robot without human supervision.

9. The method of claim 1, wherein the modification request is emanating from a single party.

10. The method of claim 1, wherein the modification request is associated with a priority level.

11. The method of claim 1, wherein the modification request is dependent on the environment perceived by the robot.

12. The method of claim 11, wherein the modification request is dependent on parameters selected from the list comprising age of a user, gender of a user, mood of a user, emotion of a user, number of users, interaction history with a user, user preferences, spatial placement of the robot and/or of a user, gesture or combination of gestures of the robot and/or a user, detected event in the environment of the robot, local weather, geolocation, date, time and combinations thereof.

13. A non-transitory computer program comprising instructions for carrying out the steps of the method according to claim 1 when said computer program is executed on a suitable computer device.

14. A system comprising means adapted to carry out the steps of the method according to claim 1.

* * * * *